US010364165B2

(12) United States Patent
Tai et al.

(10) Patent No.: US 10,364,165 B2
(45) Date of Patent: Jul. 30, 2019

(54) METHOD FOR GENERATING HYDROXYL RADICAL AND REMOVING ORGANIC POLLUTANTS IN WATER BY UTILIZING AN ORGANIC MEMBRANE

(71) Applicant: HeNan Polytechnic University, Jiao Zuo, Henan (CN)

(72) Inventors: Chao Tai, Jiao Zuo (CN); Jiaping She, Jiao Zuo (CN); Shao Dong Zhang, Jiao Zuo (CN); Tong Qian Zhao, Jiao Zuo (CN); Dang Yu Song, Jiao Zuo (CN); Lei Feng, Jiao Zuo (CN); Yu Xiang Mao, Jiao Zuo (CN); Yong An Qi, Jiao Zuo (CN); Guo Cheng Zhang, Jiao Zuo (CN); Li Jun Zhang, Jiao Zuo (CN); Juan Wang, Jiao Zuo (CN)

(73) Assignee: HENAN POLYTECHNIC UNIVERSITY, Jiao Zuo (CN)

( * ) Notice: Subject to any disclaimer, the term of this patent is extended or adjusted under 35 U.S.C. 154(b) by 16 days.

(21) Appl. No.: 15/554,332

(22) PCT Filed: Jun. 25, 2016

(86) PCT No.: PCT/CN2016/087168
§ 371 (c)(1),
(2) Date: Aug. 29, 2017

(87) PCT Pub. No.: WO2017/201795
PCT Pub. Date: Nov. 30, 2017

(65) Prior Publication Data
US 2018/0162747 A1    Jun. 14, 2018

(30) Foreign Application Priority Data
May 25, 2016   (CN) .......................... 2016 1 0353807

(51) Int. Cl.
*C02F 1/32* (2006.01)
*C02F 1/72* (2006.01)
(Continued)

(52) U.S. Cl.
CPC ................ *C02F 1/32* (2013.01); *B01D 69/02* (2013.01); *B01D 71/20* (2013.01); *B01J 35/00* (2013.01);
(Continued)

(58) Field of Classification Search
CPC ... B01J 35/00; C02F 1/725; C02F 1/32; C02F 1/72; C02F 2305/10; C02F 1/30;
(Continued)

(56) References Cited

U.S. PATENT DOCUMENTS

2013/0171026 A1*   7/2013   Li ..................... G01N 33/5306
                                                              422/69

FOREIGN PATENT DOCUMENTS

CN            104016511 A  *  9/2014

OTHER PUBLICATIONS

Bokare et al., "Review of iron-free Fenton-like systems for activating $H_2O_2$ in advanced oxidation processes", Elsevier, Journal of Hazardous Materials, 2014, vol. 275, pp. 121-135.
(Continued)

*Primary Examiner* — Walter D. Griffin
*Assistant Examiner* — Cameron J Allen
(74) *Attorney, Agent, or Firm* — Birch, Stewart, Kolasch & Birch, LLP

(57) ABSTRACT

The present invention provides a method for generating hydroxyl radicals and removing organic pollutants in water by utilizing an organic membrane. The inventive method generates hydroxyl radicals by adopting a nitrocellulose membrane as a photocatalytic material, placing the nitrocellulose membrane in water, illuminating with the sun or a
(Continued)

sunlamp having a wavelength above 280 nm as a light source, and causing the nitrocellulose membrane to undergo a photochemical reaction at the membrane surface, and the generation rate of hydroxyl radicals can be achieved by adjusting the surface area of the membrane and a light intensity. The generated hydroxyl radicals can remove phenol, bisphenol A, thiamphenicol and other typical organic pollutants in water very well. Such method for generating hydroxyl radicals is simple, economical and efficient, and does not need to introduce any hydroxyl radicals precursor into the aqueous solution; and hydroxyl radical are generated on the surface of a solid phase membrane, bring no secondary pollution, and can be applied to sewage treatment and other fields.

10 Claims, 5 Drawing Sheets

(51) Int. Cl.
B01D 71/20 (2006.01)
B01D 69/02 (2006.01)
B01J 35/00 (2006.01)
C02F 101/34 (2006.01)
C02F 1/30 (2006.01)

(52) U.S. Cl.
CPC ............ C02F 1/72 (2013.01); C02F 1/725 (2013.01); *B01D 2255/802* (2013.01); *C02F 1/30* (2013.01); *C02F 2101/345* (2013.01); *C02F 2209/44* (2013.01); *C02F 2305/023* (2013.01); *C02F 2305/10* (2013.01); *Y02W 10/37* (2015.05)

(58) Field of Classification Search
CPC ............ C02F 2101/345; C02F 2209/44; C02F 2305/02; B01D 71/20; B01D 69/02; B01D 2255/802; Y02W 10/37
See application file for complete search history.

(56) References Cited

OTHER PUBLICATIONS

Chen et al., "$H_2O_2$ assisted degradation of antibiotic norfloxacin over simulated solar light mediated $Bi_2WO_6$: Kinetics and reaction pathway", Elsevier, Chemical Engineering Journal, 2016, vol. 296, pp. 310-318.

Homem et al., "Degradation and removal methods of antibiotics from aqueous matrices—A review", Elsevier, Journal of Environmental Management, 2011, vol. 92, pp. 2304-2347.

Rivera-Utrilla et al., "Pharmaceuticals as emerging contaminants and their removal from water. A review", Elsevier, Chemosphere, 2013, vol. 93, pp. 1268-1287.

Sayed et al., "Degradation of quinolone antibiotic, norfloxacin, in aqueous solution using gamma-ray irradiation", Environ Sci Pollut Res, 2016, vol. 23, pp. 13155-13168.

Sirés et al., "Remediation of water pollution caused by pharmaceutical residues based on electrochemical separation and degradation technologies: A review", Elsevier, Environment International, 2012, vol. 40, pp. 212-229.

Su et al., "Photoelectrocatalytic degradation of the antibiotic sulfamethoxazole using $TiO_2$/Ti photoanode", Elsevier, Applied Catalysis B: Environmental, 2016, vol. 186, pp. 184-192.

Tong et al., "$TiO_2$-assisted photodegradation of pharmaceuticals—a review", Central European Journal of Chemistry, 2012, vol. 10, No. 4, pp. 989-1027.

* cited by examiner

METHOD FOR GENERATING HYDROXYL RADICAL AND REMOVING ORGANIC POLLUTANTS IN WATER BY UTILIZING AN ORGANIC MEMBRANE

RELATED APPLICATION

The present application claims priority of Chinese Patent Application Serial No. 2016103538072, filed on May 25, 2016, entitled "Method for generating hydroxyl radicals and removing organic pollutants in water by utilizing an organic membrane".

TECHNICAL FIELD

The present application belongs to the field of photochemical technology and sewage treatment, and particularly relates to a method for generating hydroxyl radicals and removing organic pollutants in water by utilizing an organic membrane.

BACKGROUND

Hydroxyl radical (•OH) is one of reactive oxygen radicals. Hydroxyl radical (•OH) has extremely strong oxidizing property with an oxidation reduction potential of 2.80 V, which is second only to that of fluorine atom and is capable of reacting with most inorganics or organics at a diffusion controlled rate with a reaction rate constant of generally greater than $10^8$ mol $L^{-1}$ $s^{-1}$. In the field of environmental science, hydroxyl radicals are used for degradation treatment of organic pollutants and are the most important reactive intermediates in the advanced oxidation processes (AOPs) for sewage treatment.

There are many methods for generating hydroxyl radicals, which can be broadly classified into chemical catalysis method, ozone/hydrogen peroxide photolysis method, photocatalysis method, electrocatalysis method, ray method, and so on. The chemical catalysis method generally uses Fenton reaction, and hydroxyl radicals are generated by catalyzing decomposition of hydrogen peroxide with iron ions. Although the method is simple, easy and cheaper, a large amount of iron-containing sludge is generated when it is applied on a larger scale, causing inconvenient subsequent processing. Ozone and hydrogen peroxide are photolyzed under the irradiation of ultraviolet light and hydroxyl radicals can be generated; however, it is needed to add hydroxyl radical precursors, such as ozone and hydrogen peroxide, and there are more side reactions. Generating hydroxyl radicals by photocatalysis with semiconductor titanium dioxide particles and the like as a catalyst needs to ensure that the catalyst is in a suspended state, and it is also needed to separate the photocatalyst simultaneously for the photocatalysis, providing poor continuous operation, and the dissolved oxygen has a greater influence on the generation of hydroxyl radicals by photocatalysis using titanium dioxide. The method for generating hydroxyl radicals by electrocatalysis has higher requirements for the dissolved oxygen in water and its catalytic components, and has lower current efficiency. There are problems of higher cost and greater harm to the human body in the ray method. Therefore, the current commonly used methods for generating hydroxyl radicals have more side reactions, have poor operability and low efficiency, or have a great harm to the environment or the human body. Accordingly, the existing methods for generating hydroxyl radicals each have their own problems, and thus it is difficult for their popularization and application.

SUMMARY

In view of the drawbacks in the prior arts mentioned above, it is the object of the present invention to provide a novel method for generating hydroxyl radicals and a method for treating organic pollutants utilizing the generated hydroxyl radicals. It is desired that the inventive method has the advantages of adjustability, low cost, simple process, easy operation but no secondary pollution, and can remove phenol, bisphenol A, thiamphenicol and other typical organic pollutants in water very well.

Specifically, the present invention provides a method for generating hydroxyl radicals by utilizing an organic membrane, characterized in that, the method comprises:
1) preparing a nitrocellulose sheet material;
2) placing the nitrocellulose sheet material in an aqueous solution;
3) irradiating the surface of the nitrocellulose sheet material by light with the wavelength above 280 nm, using the nitrocellulose sheet material as a photocatalytic material, so that the nitrocellulose sheet material undergoes a photochemical reaction at the membrane surface and generates hydroxyl radicals.

Preferably, a light source used in irradiating the nitrocellulose sheet material is the sunlight or a sunlamp having a wavelength above 280 nm.

Preferably, the nitrocellulose sheet material is a nitrocellulose membrane.

Preferably, the time for irradiating the surface of the nitrocellulose sheet material is longer than or equal to 60 min.

Preferably, the method further comprises adjusting the generation rate of hydroxyl radicals by adjusting the surface area of the membrane or adjusting intensity of the light.

In another aspect, the present invention provides a method for generating hydroxyl radicals to remove organic pollutants in water by utilizing an organic membrane, characterized in that, the method comprises:
1) preparing a nitrocellulose sheet material;
2) placing the nitrocellulose sheet material in a liquid containing water and organic pollutants;
3) irradiating the surface of the nitrocellulose sheet material by light having a wavelength of more than 280 nm, using the nitrocellulose sheet material as a photocatalytic material, so that the nitrocellulose sheet material undergoes a photochemical reaction at the membrane surface and generates hydroxyl radicals;
4) carrying out oxidation decomposition of the organic pollutants in the liquid by utilizing the generated hydroxyl radicals.

Preferably, the method is applied in removing phenol, bisphenol A and thiamphenicol in water.

Preferably, a light source used in irradiating the nitrocellulose sheet material is the sunlight or a sunlamp having a wavelength of more than 280 nm.

Preferably, the time for irradiating the surface of the nitrocellulose sheet material is greater than or equal to 60 min.

Preferably, the method further comprises adjusting the generation rate of hydroxyl radicals by adjusting the surface area of the membrane or adjusting intensity of the light.

The nitrocellulose mentioned in the present invention has a molecular structural formula as follows:

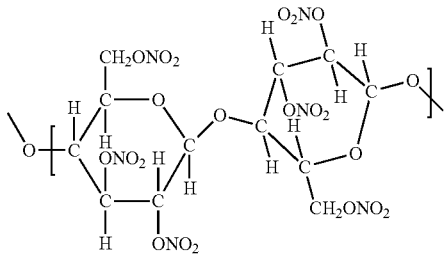

In conclusion, the method for generating hydroxyl radicals according to the present invention generates hydroxyl radicals by adopting a nitrocellulose membrane as a photocatalytic material, placing the nitrocellulose membrane in water or an aqueous solution, illuminating with the sun or a sunlamp having a wavelength of greater than 280 nm as a light source, and causing the nitrocellulose membrane to undergo a photochemical reaction at the membrane surface, the generation rate of hydroxyl radicals can be achieved by adjusting a surface area of the membrane and a light intensity, and the generated hydroxyl radicals can remove phenol, bisphenol A, thiamphenicol and other typical organic pollutants in water very well.

Nitrocellulose has high quality at a low price, and is widely used in the fields of ink, leather, plastic articles, etc. Nitrocellulose is the main material of microporous filtering membrane, and has a very mature membrane forming process. The invention finds that nitrocellulose can generate hydroxyl radicals under illuminating, and that nitrocellulose serving as a photocatalytic material for generating hydroxyl radicals under light radiation having a wavelength above 280 nm, has good effect of removing organic pollutants and thus is expected to be applied to the field of water treatment.

The applicant finds that, compared with other wavelengths, UVB (280~320 nm) has extremely obvious advantageous when being used to photocatalyze the nitrocellulose membrane to generate hydroxyl radicals, the effect of which is 8 times of UVA (320~400 nm). Therefore, preferably, light in UVB spectrum range is used for illuminating the nitrocellulose membrane. Preferably, wavelength of illumination light source is 280~320 nm.

In another preferred embodiment, the nitrocellulose membrane is made into a wavy shape with its surface in the form of a sine wave. The applicant finds that the light utilization rate of the nitrocellulose membrane having such structure is significantly higher than that of ordinary flat nitrocellulose membrane and also higher than those of other forms of cellulose membranes.

The invention has the advantageous effects as follows:

1. In the inventive method, hydroxyl radicals are generated on the surface of the nitrocellulose membrane, facilitating recycling and reusing, and solving the problems of difficult recycling of particle catalysts, and the inventive method can stably and continuously generate hydroxyl radicals at a uniform speed, achieving controlled generation of hydroxyl radicals;

2. The inventive method does not need to bring in any hydroxyl radical precursor, avoiding secondary pollution;

3. Ultraviolet light radiation having a wavelength of greater than 280 nm can cause the nitrocellulose membrane to generate hydroxyl radicals, so the sunlight can be directly utilized, reducing the cost for water treatment;

4. Since the mutual light-shading problem of particle catalysts has been overcome by adopting the nitrocellulose membrane, the generation rate of hydroxyl radicals can be adjusted by adjusting the area of the membrane or adjusting intensity of the light;

5. As compared with currently adopted titanium dioxide catalyst, the nitrocellulose is low in price and is easily to be promoted and applied on a large scale.

DETAILED DESCRIPTION

The following embodiments further illustrate the invention, so as to serve as explanation of the technical content of the invention. However, the substantial content of the invention is not limited to be as described by the following embodiments, and one of ordinary skill in the art may and should understand that any simple change or substitution based on the substantial spirit of the invention should be within the scope claimed by the invention.

Embodiment 1

In this embodiment, an ESR qualitative analysis of the hydroxyl radicals generated by surface photocatalysis of nitrocellulose is conducted.

Figure 1:
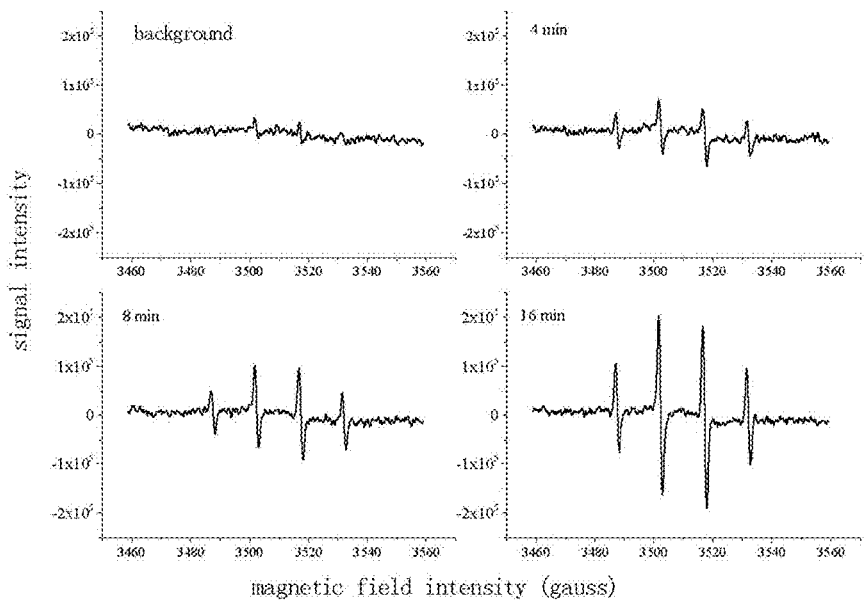
FIG. 1 shows an ESR qualitative analysis result of the hydroxyl radicals generated by surface photocatalysis of the nitrocellulose membrane.

The nitrocellulose membrane is cut into strips of 2 cm in length and 0.1 cm in width, which are stuffed into a quartz sample tube, and 100 mM dimethyl pyridine N-oxide (DMPO) is added therein before performing in-situ electron spin resonance spectroscopy analysis and detection. In case of illuminating using a 180 W sunlamp, the generation of hydroxyl radicals is monitored in real time. The results are shown in FIG. 1, wherein during the time of not illuminating, the background signal is basically a flat line, during the time of illuminating for 4 min, 8 min and 16 min, the characteristic signals of the hydroxyl radicals and DMPO adduct can be observed to have four peaks with a peak height ratio of 1:2:2:1 and a hyperfine splitting constant $a_H=a_N=14.9$ Gauss, and the peak height increases linearly with increase of illumination time, so it is confirmed that the surface photocatalysis of the nitrocellulose membrane can generate hydroxyl radicals with the generation amount of hydroxyl radicals increasing linearly with the illumination time.

In the present embodiment, measurement of hydroxyl radicals is carried out by DMPO capturing and then measuring by electron spin resonance (ESR). The electronic spin resonance experimental device comprises an ESR (German Bruker EMX-plus 10/12) spectrometer and a sunlamp (America Megra, 180 W). The ESR experiment parameters are as follows: microwave frequency of 9.8527 GHz; microwave power of 20 mW; scanning range of 3459-3559 G; and scanning step length of 1 G.

Embodiment 2 (Generation of Hydroxyl Radicals when Using Membrane with Different Areas)

Figure 2:
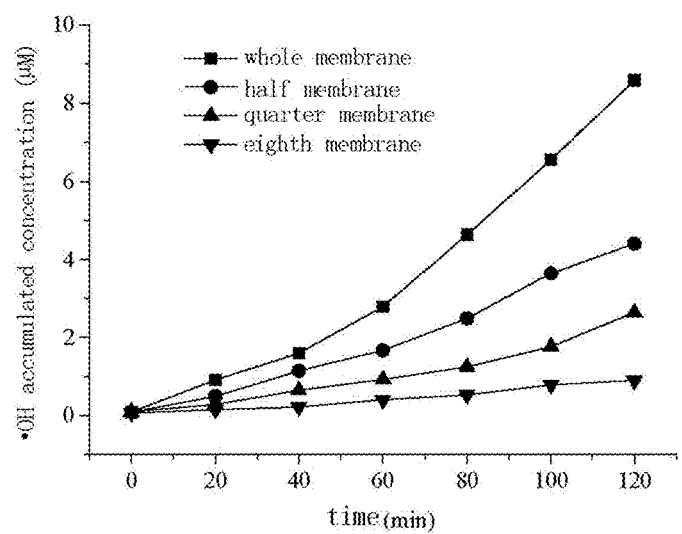
FIG. 2 shows a time-concentration curve of the hydroxyl radicals at different membrane areas.

50 mL of 10 mM benzene solution is added into a 100 mL beaker, a whole piece, a half piece, a quarter piece and an eighth piece of nitrocellulose membrane sheet having a diameter of 47 mm (φ 47 mm) are placed therein, the membrane sheet is kept still at the bottom of the beaker and placed under a 180 W sunlamp for illuminating, and hydroxyl radicals formed via illumination from the nitrocellulose membrane is reacted with benzene to generate phenol. Sampling is carried out every 20 min and change in the concentration of phenol in the solution is analyzed by high performance liquid chromatography, reflecting the generation of hydroxyl radicals. The results are shown in FIG. 2, from which it can be seen that the generation amount of hydroxyl radicals is basically in linear relation with increase of the area of the nitrocellulose membrane, indicating that hydroxyl radicals can be generated quantitatively and stably by illuminating the nitrocellulose membrane. In order to further clarify the reasons of the generation of hydroxyl radicals, the inventors conduct the same experiment with cellulose and cellulose acetate membranes. However, it is found that no phenol is generated from cellulose and cellulose acetate membranes under the same illuminating conditions, indicating that generation of hydroxyl radicals by photocatalysis of the nitrocellulose membrane is closely related to nitro in the nitrocellulose membrane.

Embodiment 3 (Excluding of Generating Hydroxyl Radicals Via Illumination from Solution-Phase Nitrate and Nitrite)

Figure 3:
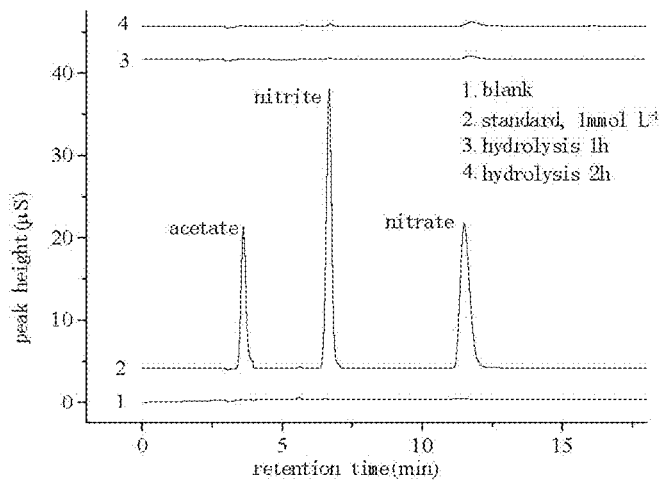
FIG. 3 shows a time-concentration curve reflecting generation of nitrate and nitrite via hydrolysis of the nitrocellulose membrane.
Figure 4:
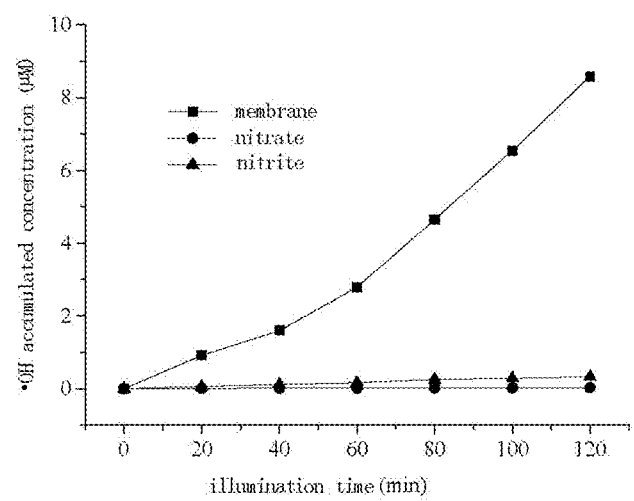
FIG. 4 shows a result of comparing the generation of hydroxyl radicals from a nitrite aqueous solution, a nitrate aqueous solution and a nitrocellulose membrane under illumination.

Nitrocellulose membrane is a nitrate of cellulose in view of chemical structure, which may be hydrolyzed to generate nitrate or nitrite, but now it cannot be excluded that the latter two can also generate hydroxyl radicals when being illuminated. In order to exclude the above possibility, hydrolysis experiment of the nitrocellulose membrane is carried out. A piece of nitrocellulose membrane of φ 47 mm is placed in pure water and hydrolyzed at 35° C., and nitrate and nitrite generated by hydrolysis are measured by adopting ion chromatography. The measured result is compared with those of a blank sample and a standard sample, and the comparision result is shown in FIG. 3. It can be seen that the nitrocellulose membrane is only slightly hydrolyzed in water; and as compared with a standard condition, only 0.8 μM nitrite and 2.3 μM nitrate are generated in the solution through two hours of hydrolysis. The generation of hydroxyl radicals by illuminating an aqueous solution containing 0.8 μM nitrite and 2.3 μM nitrate under the same conditions is investigated and compared with the generation of hydroxyl radicals by illuminating the nitrocellulose membrane, and the result is shown in FIG. 4. It can be seen that hydroxyl radicals generated by illuminating the nitrocellulose membrane are mainly generated on the surface of the membrane, whereas nitrate and nitrite generated in the solution-phase almost does not work.

Embodiment 4 (Generation of Hydroxyl Radicals Via Surface Photocatalysis of the Nitrocellulose Membrane in Cases of Introducing Nitrogen and Oxygen)

Figure 5:
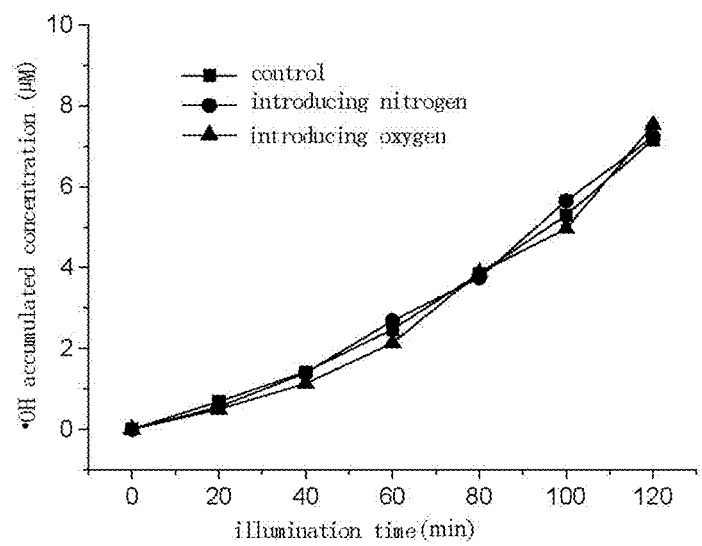
FIG. 5 shows the generation of hydroxyl radicals via surface photocatalysis of the nitrocellulose membrane under nitrogen-purging, oxygen-purging and control experiment.

Using ultrapure water with nitrogen or oxygen purging therein for 30 min in advance, a 10 mM benzene solution is prepared under conditions of purging nitrogen and oxygen respectively, 50 mL of the above benzene solution is added into a 100 mL beaker respectively and then a piece of the nitrocellulose membrane sheet of φ 47 mm is placed therein, and the membrane sheet is kept still at the bottom of the beaker and placed under a 180 W sunlamp illuminated under the conditions of purging nitrogen and oxygen respectively, so that hydroxyl radicals formed by illuminating the nitrocellulose membrane are reacted with benzene to generate phenol. Sampling is carried out every 20 min, and change in the concentration of phenol in the solution is analyzed by high performance liquid chromatography to indicating the generation of hydroxyl radicals, which is compared with the generation of hydroxyl radicals under conditions of no gas purging. The result is shown in FIG. 5, from which it can be seen that introduction of nitrogen and oxygen has no effect on generation of hydroxyl radicals via photocatalysis of the nitrocellulose membrane, indicating that hydroxyl radicals are generated directly from the surface of the nitrocellulose membrane, which is irrelevant to oxygen in the solution, and that generation of hydroxyl radicals from the nitrocellulose membrane do not requires any precursor.

Embodiment 5 (Generation of Hydroxyl Radicas in Case of Reusing the Nitrocellulose Membrane)

Figure 6:
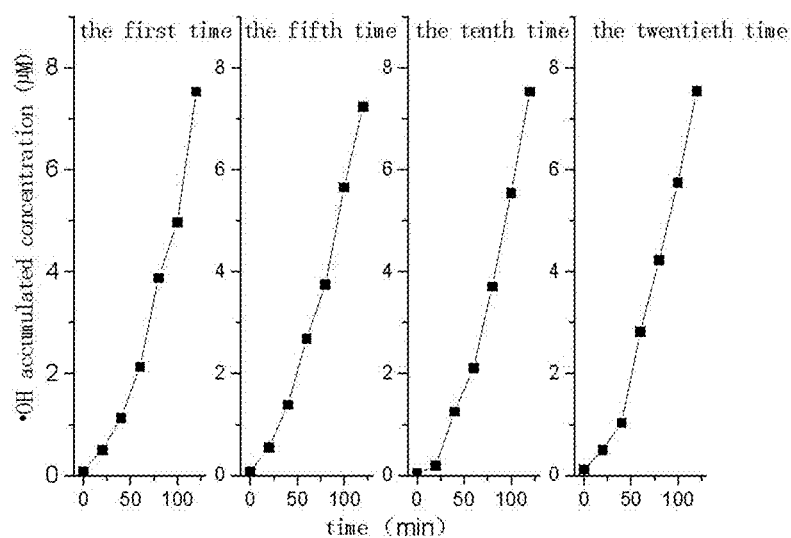
FIG. 6 shows a time-concentration curve reflecting the generation of hydroxyl radicals in cases of different repetition times when resuing the nitrocellulose membrane.

50 mL of 10 mM benzene solution is added into a 100 mL beaker, a piece of nitrocellulose membrane sheet of φ 47 mm is placed therein, the membrane sheet is kept still at the bottom of the beaker and placed under a 180 W sunlamp for illuminating, and the hydroxyl radicals formed by illuminating the nitrocellulose membrane is reacted with benzene to generate phenol. Sampling is carried out every 20 min and change in the concentration of phenol in the solution is analyzed by high performance liquid chromatography. The benzene solution in the beaker is replaced by a non-illuminated fresh 10 mM benzene solution every two hours, and the nitrocellulose membrane and beaker are washed sufficiently. The above steps are repeated, so as to investigate whether activity of the nitrocellulose membrane for generating hydroxyl radicals by repeatedly illuminating decreases. The result is shown in FIG. 6, from which it can be seen that activity of the nitrocellulose membrane for generating hydroxyl radicals by illuminating does not yet obviously decrease even over 20 times of reuse.

Embodiment 6

Figure 7:
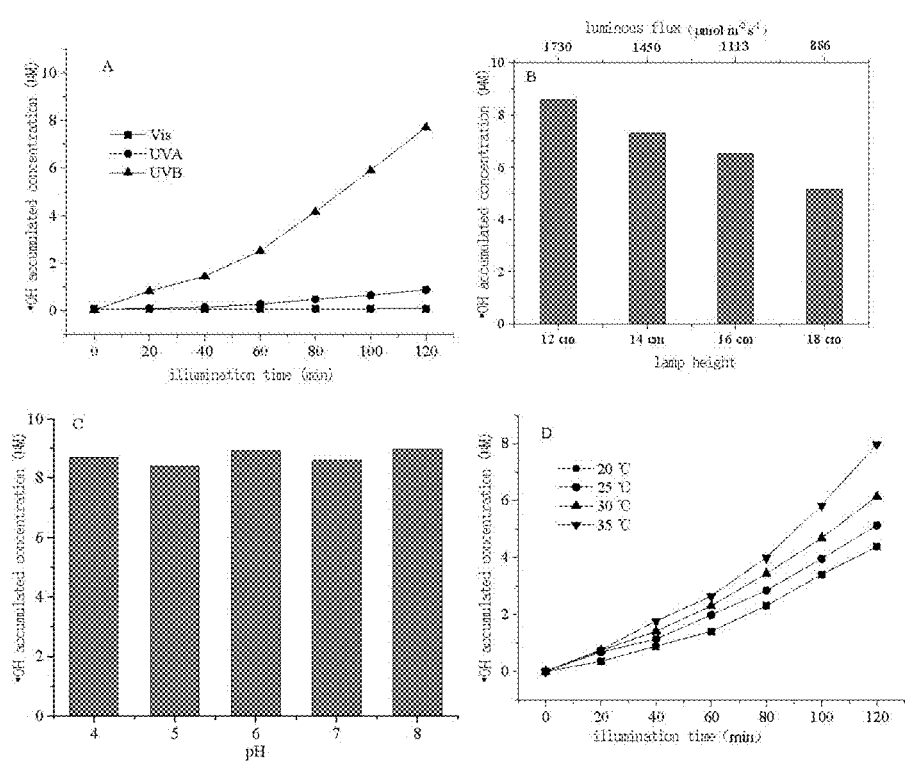
FIG. 7 shows the effects of spectrum range (A), light intensity (B), pH (C) and temperature (D) on the generation of hydroxyl radicals.

As shown in FIG. 7, the effects of different spectrum ranges on generation of hydroxyl radicals are investigated by adopting different light filters to filter UVA and UVB in the sunlamp light respectively under the following conditions: a lamp height of 12 cm, a temperature of 35° C. and a pH of 7 (FIG. 7). It can be seen that the spectrum range effective for generating hydroxyl radicals via photocatalysis of nitrocellulocose membrane comprises UVA and UVB, while the capability of generating hydroxyl radicals for UVB being stronger than that for UVA, while the visible light region is ineffective basically.

The effects of the light intensity (the luminous flux are 1730, 1450, 1113 and 886 μmol m$^{-2}$ s$^{-1}$ respectively) on generation of hydroxyl radicals under the conditions of the illumination heights of respective 12, 14, 16 and 18 cm are investigated under the conditions of spectrum of UVA+UVB+Vis, a temperature of 35° C. and a pH of 7 by adjusting illumination height of the sunlamp to adjust the light intensity (FIG. 7B). It can be seen that generation of hydroxyl radicals via photocatalysis of the nitrocellulose membrane increases as the light intensity increasing.

The effects of different acidity conditions on generation of hydroxyl radicals are investigated under the conditions of spectrum of UVA+UVB+Vis, a lamp height of 12 cm and a temperature of 35° C. by adjusting acidity with 0.1 M phosphoric acid and 0.1M NaOH (FIG. 7C). It can be seen that acidity has very small effect on generation of hydroxyl radicals via photocatalysis of the nitrocellulose membrane under a pH within 4-8.

The effects of different temperatures on generation of hydroxyl radicals are investigated under the conditions of UVA+UVB+Vis, a lamp height of 12 cm and a pH of 7 (FIG. 7D). It can be seen that the higher the temperature is, the more beneficial it is to generation of hydroxyl radicals via photocatalysis of the nitrocellulose membrane. In conclusion, the spectrum range playing a leading role in generation of hydroxyl radicals via photocatalysis of the nitrocellulose membrane is UVB; acidity within a pH of 4-8 has a smaller effect on generation of hydroxyl radicals; and the higher the temperature is, the stronger the light intensity is, it is more beneficial to generation of hydroxyl radicals.

In Embodiments 2 to 6, the hydroxyl radicals are measured by reacting hydroxyl radicals with benzene to generate phenol to reflect the generation of hydroxyl radicals. Phenol is measured by adopting high efficiency liquid chromatography (America Agilent 1200), wherein the used separation column is Zorbax SB-C18 (150 mm×4.6 mm, 5 μm); the detector is fluorescence detector with an excitation wavelength and an emission wavelength respectively of 260 and 310 nm; and the mobile phase is 40% acetonitrile aqueous solution (v/v), pH of which is adjusted with hydrochloric acid to about 2-3, and the flow rate of the mobile phase is 1 ml/min.

Embodiment 7 (Removement of Organic Pollutants in Water Via Catalysis of the Nitrocellulose Membrane Under a Sunlamp and the Sunlight)

Figure 8:
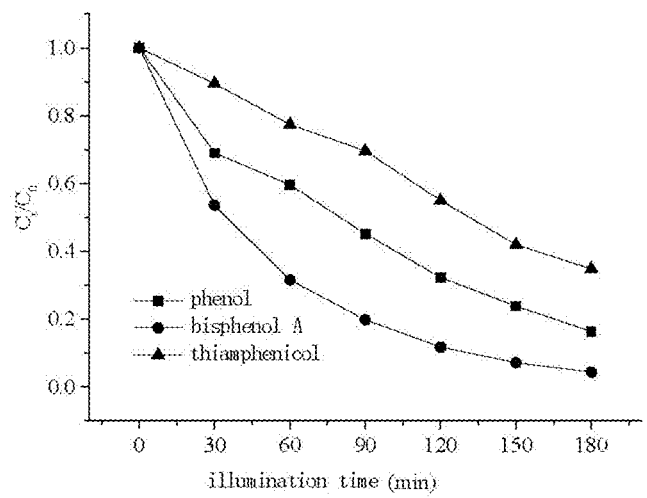
FIG. 8 shows the concentrations of phenol, bisphenol A and thiamphenicol versus time when removing the three pollutants in water via photocatalysis of the nitrocellulose membrane under a sunlamp.
Figure 9:
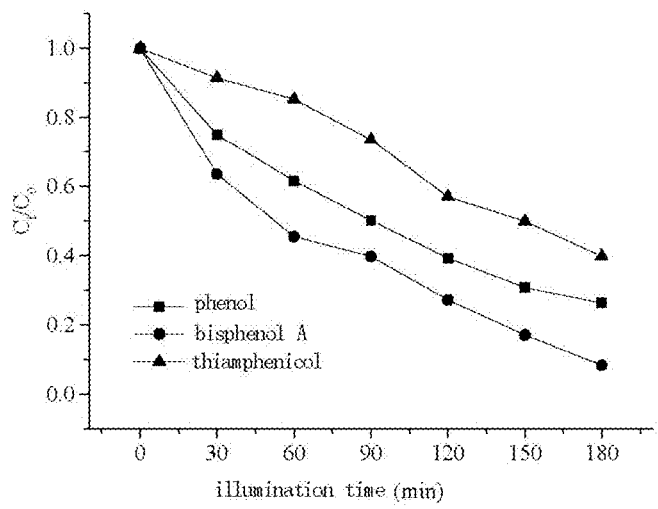
FIG. 9 shows the concentrations of phenol, bisphenol A and thiamphenicol versus time when removing the three pollutants in water via photocatalysis of the nitrocellulose membrane under the sunlight.

50 mL of 50 μM phenol, bisphenol A and thiamphenicol aqueous solutions are respectively added into a 100 mL beaker, one nitrocellulose membrane sheet of φ 47 mm is added in each breaker, and the membrane sheet is kept still at the bottom of the beaker and placed under a 180 W sunlamp for irradiation. Sampling is carried out every 20 min and changes in the concentrations of phenol, bisphenol A and thiamphenicol in the solutions are analyzed by high performance liquid chromatography; and under the same experimental conditions as above, the same experiments are carried out under the sunlight, the results are respectively shown in FIG. 8 and FIG. 9. It can be seen that phenol, bisphenol A and thiamphenicol can be removed very well via illumination on the nitrocellulose membrane whether under the sunlamp or under the sunlight. However, it is found that none of phenol, bisphenol A and thiamphenicol is removed when there is no illumination or when there is hydroxyl radical scavenger, isopropanol (10 mM), in the solution although under illumination. The above results indicate that the active species for removing organic pollutants in water via photocatalysis of the nitrocellulose membrane are hydroxyl radicals.

In a preferred implementation, the time for illumination on the nitrocellulose membrane is greater than or equal to 60 min. The applicant finds that if the nitrocellulose membrane is continuously illuminated, the generation rate of hydroxyl radicals after 60 min is about 3 times of the generation rate of hydroxyl radicals in 60 min, and if the illumination is stopped intermediately and then is continued, the generation rate of hydroxyl radicals returns again to a normal rate.

In another preferred implementation, the nitrocellulose membrane and the sewage are preheated prior to illumination, and the generation rate of hydroxyl radicals at 35° C. is about twice of that at about 20° C.

In a third preferred implementation, the larger the membrane area is, the higher the generation rate of hydroxyl radicals is. Therefore, to improve pollutant treatment effect, the contact area between the membrane and the sewage should be increased as much as possible.

While the principles of the invention have been described in detail with reference to the preferred embodiments of the present invention, it will be understood by those skilled in the art that the foregoing embodiments are merely explanation of the illustrative embodiments of the invention and are not intended to limit the scope of the invention. The details in the embodiments are not to be construed as limiting the scope of the invention, and any obvious change such as equivalents, simple substitutions and the like, which are based on the technical solutions of the present invention without departing from the spirit and scope of the invention, falls within the protection scope of the present invention.

The invention claimed is:

1. A method for generating hydroxyl radicals by utilizing an organic membrane, the method comprising:
   1) preparing a nitrocellulose sheet material, which is used as the organic membrane;
   2) placing the nitrocellulose sheet material in an aqueous solution;
   3) irradiating a surface of the nitrocellulose sheet material by light having a wavelength of above 280 nm with the nitrocellulose sheet material as a photocatalytic material, so that the nitrocellulose sheet material undergoes a photochemical reaction at the surface of the nitrocellulose sheet material, generating hydroxyl radicals.

2. The method according to claim 1, wherein the light used to irradiate the nitrocellulose sheet material is sunlight or light having a wavelength above 280 nm emitted by a sunlamp.

3. The method according to claim 1, wherein the nitrocellulose sheet material is a nitrocellulose membrane.

4. The method according to claim 1, wherein a time for irradiating the surface of the nitrocellulose sheet material is longer than or equal to 60 min.

5. The method according to claim 1, further comprising:
   adjusting a generation rate of hydroxyl radicals by adjusting a surface area of the membrane and adjusting an intensity of the light.

6. A method for generating hydroxyl radicals to remove organic pollutants in water by utilizing an organic membrane, the method comprising:
1) preparing a nitrocellulose sheet material, which is used as the organic membrane;
2) placing the nitrocellulose sheet material in a liquid containing water and organic pollutants;
3) irradiating a surface of the nitrocellulose sheet material by light having a wavelength of above 280 nm, using the nitrocellulose sheet material as a photocatalytic material, so that the nitrocellulose sheet material undergoes a photochemical reaction at the surface of the nitrocellulose sheet material and generates hydroxyl radicals;
4) carrying out oxidation decomposition of the organic pollutants in the liquid by utilizing the generated hydroxyl radicals.

7. The method according to claim 6, wherein the organic pollutants removed from water are phenol, bisphenol A and thiamphenicol.

8. The method according to claim 6, wherein the light used in irradiating the nitrocellulose sheet material is sunlight or light having a wavelength above 280 nm emitted by a sunlamp.

9. The method according to claim 6, wherein a time for irradiating the surface of the nitrocellulose sheet material is greater than or equal to 60 min.

10. The method according to claim 6, further comprising:
adjusting a generation rate of hydroxyl radicals by adjusting a surface area of the membrane and adjusting an intensity of the light.

* * * * *